Patented Aug. 1, 1944

2,354,982

UNITED STATES PATENT OFFICE 2,354,982

ABSORPTION MACHINE CONTAINING AN INERT AUXILIARY GAS

Alexander Bikkers, The Hague, Netherlands; vested in the Alien Property Custodian Application February 6, 1941, Serial No. 377,745
In the Netherlands February 21, 1940

10 Claims. (Cl. 62—119.5)

The invention relates to a continuous absorption machine containing an inert auxiliary for gas equalizing the differences in the refrigerant pressures, and more particularly relates to a machine of the type in which a refrigerant is used having a higher density, also when in gaseous condition, than the inert auxiliary gas, that is to say the refrigerant vapour always is heavy relatively to the inert auxiliary gas. As an example may be mentioned here the use of hydrogen ($H_2$) as an inert auxiliary gas and of ammonia ($NH_3$) as a refrigerant.

In absorption machines of the kind referred to the inert or neutral auxiliary gas always has the tendency to circulate through the apparatus, due to differences in density arising at several points of the apparatus, which differences in their turn are due to differences in temperature or to different contents of the heavy refrigerant in the mixture of auxiliary gas and refrigerant. Such movements cause conveyance of heat within the machine and in general undesired conveyance of heat which affects the efficiency of the machine. When warm gases from the absorber reach the evaporator they are cooled down therein but the cold needed therefore is lost for refrigeration purposes proper and therefore the efficiency of the machine decreases.

It is an object of the invention to improve continuous absorption machines of the kind referred to in this respect.

It is a further object of the invention to decrease or to prevent circulation of gases between the absorber and the evaporator and to obtain the necessary exchange of refrigerant between the said vessels only by way of diffusion, settlement, segregation, gravity or the like.

Another object of the invention is to so dimension and arrange the evaporator, the absorber and the parts interconnecting same as to prevent circulation through these parts due to differences in density of the gases such as a thermo-syphonic circulation, by counteracting differences in static pressure heads in the system of absorber and evaporator by other specially generated static pressures, equalizing the driving pressure heads or obstructing the circulation in starting.

Embodiments of the invention are illustrated in the attached drawing.

Figure 2:
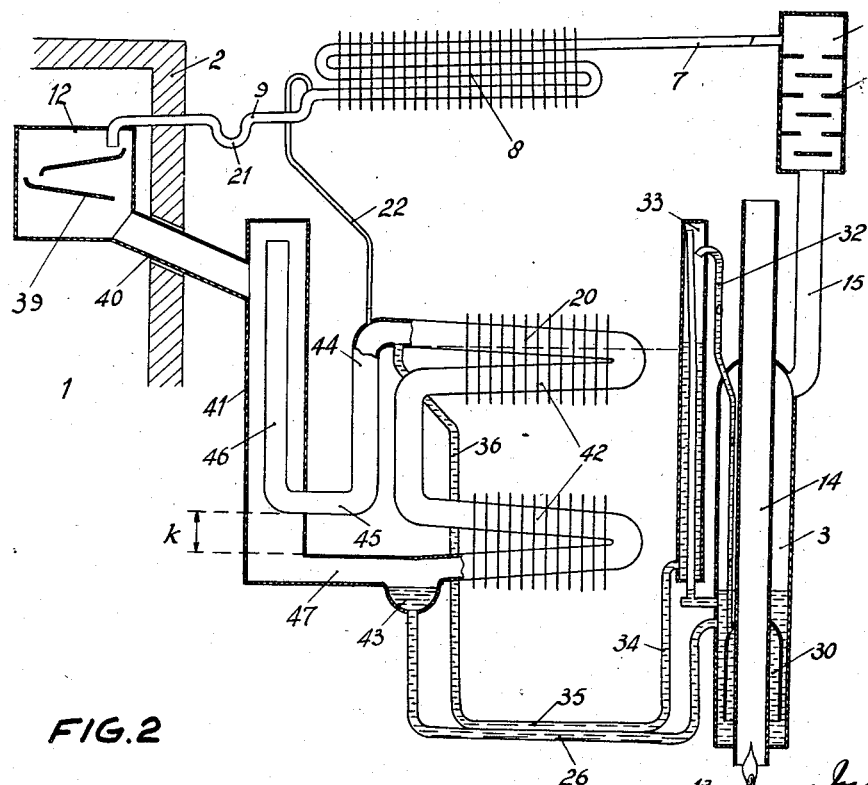
Fig. 2 is a corresponding illustration of a modified form of absorption machine according to the invention.

In both figures 2 indicates the insulated wall of a cabinet the interior space 1 of which is to be cooled down. Inside the said space is the evaporator 12 of the refrigerating machine or apparatus.

Figure 1:
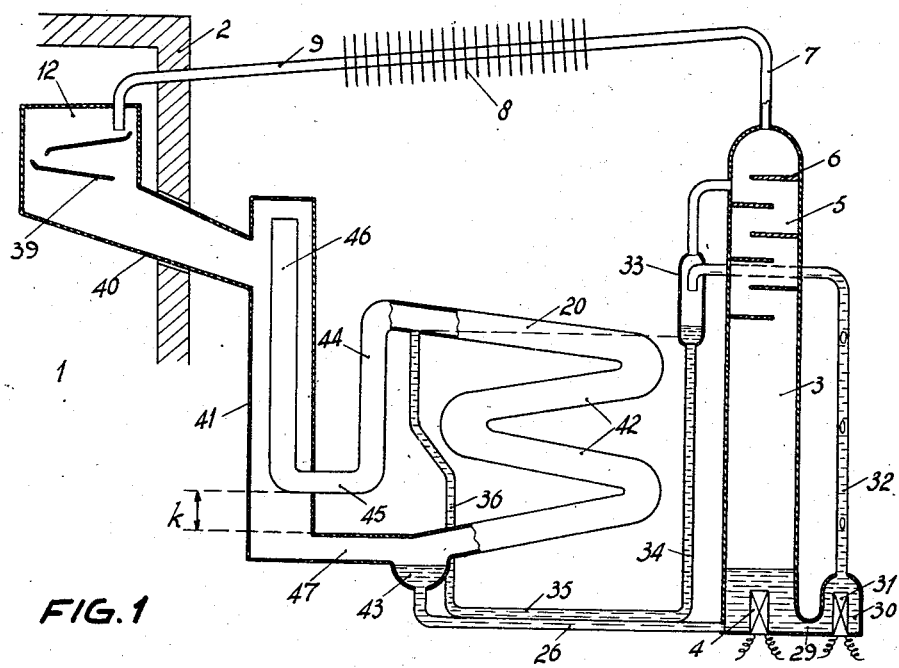
Fig. 1 is a diagrammatic illustration of an absorption machine according to the invention, the generator, the evaporator and the connection of the latter to the absorber in section, the absorber partly in section.

In Fig. 1 the generator, boiler or gas expelling vessel 3 is provided with a heating device in the form of an electrical heating element 4. The generator 3 is provided at the top with a liquid separator or rectifier 5, but the latter can be made as a separate member connected to the generator 3. In the interior of the rectifier 5 a plurality of obstructing members are arranged, here shown as baffles 6. The rectifier 5 is connected to the condenser 8 by a conduit 7, guiding the rectified refrigerant vapour under a relatively high pressure to have it cooled down and liquefied, in this case in and by the air cooled condenser 8 which therefore is provided with ribs or the like.

From the condenser 8 the liquefied refrigerant reaches the evaporator 12 by means of the conduit 9.

The generator 3 is connected at the bottom to an auxiliary boiler 30 by means of a passage 29. This auxiliary boiler 30 is provided with a heating device formed by an electrical heating element 31 and at the top with an upright tube 32 leading to the vessel 33. The tube 32 together with the preferably bell-shaped boiler vessel 30 constitutes a so-called heat pump or bubble pump for raising boiled liquid to the vessel 33 at a higher level. This vessel 33 is connected at the bottom to a conduit 34, 35, 36 leading to the upper branch 20 of the absorber 42. At the top the vessel 33 is in open communication with the rectifier 5, to which thus the vaporous or gaseous constituents separated in the vessel 33 can pass.

The boilers 3 and 30 have to be filled to a level as shown with a solution of ammonia in water, whereas the whole of the apparatus further is filled with hydrogen under a rather high pressure, e. g. of 18 atmospheres. On heating by the elements 4 and 31 the system illustrated in Fig. 1 operates as follows:

Gaseous refrigerant (ammonia) is expelled from the solution in the generator 3. This gas will pass the rectifier 4 and reach through the conduit 7 the condenser 8 in which it is cooled down and liquefied. This liquid passes through the conduit 9 into the evaporator 12 in which it falls on and flows over partitions 39, baffles, plates or the like, on which it will evaporate, causing a consumption of heat with the result of cooling down the evaporator 12. When the liquefied refrigerant does not leave the conduit 9 in the form of a continuous flow, but in the form of drops, evaporation may occur somewhat discontinuously. At the points of evaporation a gaseous mixture is formed consisting of hydrogen containing relatively much ammonia vapour, thus being relatively heavy. This gaseous mixture flows down in the evaporator through openings or apertures by the side of or in the partitions or the like 39, leaving, however, the rest of the atmosphere within the evaporator substantially at rest. If the heavy gas, in its downward movement, passes areas of different temperature it always acquires the temperature of the surroundings very quickly.

The gas reaches the bottom of the evaporator 12 which merges into an inclined passage 40. It flows down along the bottom of the evaporator 12 and of the conduit 40. Of course the inclination of these bottom surfaces may not be too small. Practice has shown that the said surfaces never may be at a smaller angle than one of 6° with the horizontal.

The inclined passage 40 debouches into an upright conduit 41. If desired, however, the conduits 40 and 41 could be combined into one single inclined or upright conduit.

The absorber 42 is located sidewards of the conduit 41 and the bottom portion of it is connected to the lower end of the said conduit 41 by a passage 47. In this passage 47 a vessel 43 is formed collecting the water which has been fed by gravity from the vessel 33 to the top in the branch 26 of the absorber tube 42 and has flowed down through the whole of the absorber, enriching itself again with ammonia.

The gas mixture falling down in the conduit 41 gradually will enter the passage 47 and absorption then will begin at the level of the water in the vessel 43, that is to say the ammonia will be taken up by the water. This absorption will cause some heating and will be continued in the conduits 42 and 26. It may be taken therefore that a certain convection will occur in the absorber 42.

The absorber has a second connection to the conduit 40, 41. Therefore a U-shaped tube 44, 45, 46 is connected with one end to the top of the absorber, whereas the other end is in free communication with the contents of the conduit 40, 41. This U-shaped tube can be so dimensioned and arranged (by varying the lengths of the upright legs 44 and 46 and the level of the lowermost part 45 relatively to the absorber 42) that no circulation, thus no convection flow due to differences in temperature or density will be able to occur in an anti-clockwise direction through the absorber 42. The tendency of the gases in the absorber 42 to flow upwards due to the increasing temperature and the decreasing density as a result of the absorption is counteracted by the tendency of the gases in the tube 46 to flow downwards. The result is that ammonia is only sucked from the evaporator 12 through the passage 46 to the absorber 42 and absorbed therein by water, without warm gases leaving the absorber in a continuous flow through the tube 46, which would reach the evaporator 12 and affect the cold production of the latter. The open communication through the tube 46 is necessary, however, probably for pressure equalizing purposes.

The U-shaped tube 44, 45, 46 acts to retard circulation. This purpose is served by arranging the tube 46 in cold exchange relation with the contents of the conduit 40, 41 and therefore it is mounted in the interior of the upright part 41 of the latter and in order to bring the open end of the tube 46 out of the reach of the down flowing gases the inclined conduit 40 debouches into the upright conduit 41 some distance below the top of the latter, whereas the tube 46 extends at the top beyond the point of debouchment of the conduit 40 into the conduit 41.

The retarding action on circulation of the U-shaped tube 44, 45, 46, apart from its total length, its sectional area and the difference in temperature of both legs, is dependent on the distance between the lowermost point of the U-shaped tube and the other connection of the absorber to the passage 47. The said distance is indicated in Fig. 1 by the letter $k$. Practice has shown that in a machine for domestic purposes, having a capacity of say 150 calories per hour (600 B. t. u./h.) the said distance $k$ may not exceed three inches. The optimal value is still smaller.

The absorption heat generated within the absorber 42 is transmitted and delivered to the outer atmosphere.

The water enriched with ammonia within the absorber 42 and collected in the space 43 returns through the conduit 26 to the generator 3. This conduit 26 is in heat exchange relation with the conduit 35 in order to preheat the water flowing to the generator 3 and cool down the water flowing to the absorber 42.

A machine according to the invention has a high efficiency, especially because no substantial exchange of hydrogen between the absorber and the evaporator is found therein. The conduit 40, 41 bridges the temperature difference between the evaporator and the absorber, the gaseous masses sinking down through the conduit 40 and 41 adapting themselves continuously to the changing temperature due to continuous exchange of hydrogen with the surroundings by diffusion. The absorber cannot cause any thermosyphonic circulation in the conduit 40, 41.

The embodiment illustrated in Fig. 2 only differs in details from that illustrated in Fig. 1. Corresponding parts are indicated by the same numerals as in Fig. 1. The generator 3 is heated by a gas burner 13 mounted under a flue 14. If desired the flue 14 may be provided internally with baffles or other obstruction members in order to cool down the flame gases as far as possible.

The bell-shaped vessel 30 for the heat pump is placed within the generator 3 and is thus heated by the same source of heat as the generator 3 proper. The return flow of water enriched with ammonia through the tube 26 enters the generator 3 near the level of the liquid, so that the gas is expelled again at any event before the water can enter the bell-shaped vessel 30 from below. Also the raising tube 32 is partly mounted within the generator 3. The gas separated in the vessel 33, however, is returned to the generator 3 under the level of the liquid therein.

The rectifier 5 provided with baffles 6 or the like is made as a separate vessel, connected to the generator by the tube 15.

The condenser 8 has been illustrated as a serpentine, connected to the rectifier 5 by the tube 7 and connected to the evaporator 12 by the tube 9. The latter tube comprises a liquid seal 21. Due to this the condenser 8 must be provided with an open communication with the absorber in order to permit discharge, if necessary, of gases (hydrogen) in excess. Such communication is established by the tube 22.

The evaporator 12 and the conduit 40, 41 is exactly the same as in Fig. 1. Only the evaporator 12 does not merge into the inclined conduit 40 in the same manner, but the evaporator 12 is formed as a unit per se to which the conduit 40 is connected near the bottom.

The absorber 42 only slightly differs in shape from that in Fig. 1 and is provided with ribs for the purpose of a better transmission of the absorption heat to the surrounding atmosphere.

Again the distance k is of great importance though not the determining factor.

It will be understood that several modifications in the draft and construction of the apparatus are possible within the scope of the invention as covered by the claims. The invention is not limited to the combination of ammonia (as the refrigerant) water (as the absorption medium) and hydrogen (as the inert auxiliary gas), as other combinations are possible and usual. But hydrogen and ammonia have a great difference in their specific gravities, which is favourable for the principle according to the invention.

What is called a U-shaped tube 44, 45, 46 in Figs. 1 and 2 can be replaced by a conduit of a somewhat modified form, if only of such form that from one end to the other and vice versa it first runs in a downward direction and subsequently in an upward direction. If the total height of the absorber 42 is reduced the length of the tube 44 will be reduced too. The length of the tube 46 will be then the determining factor again. Also the distance k can have a negative value, i. e. the part 45 under circumstances can take a position underneath the passage 47.

What I claim is:

1. A continuous absorption machine comprising an absorber and an evaporator containing an inert auxiliary gas and a refrigerant which in the gaseous state is of a relatively higher density than the inert auxiliary gas, said evaporator being situated at a higher level than the said absorber, and full open communication means between the interior spaces of the said absorber and the said evaporator, said communication means being connected to the evaporator adjacent the bottom thereof, the absorber being located laterally of the lower part of the said communication means and being in open connection with the same through two passages at different levels, the upper one of said passages being formed by a U-shaped conduit having one leg connected to the absorber and the other leg connected to the said communication means, said U-shaped conduit being dimensioned and arranged so as to prevent substantial reverse flow therethrough of the inert auxiliary gas from the absorber to the evaporator due to differences in density as between the gases in different parts of the space enclosed by said evaporator, absorber and communication means.

2. A continuous absorption machine comprising an absorber and an evaporator containing an inert auxiliary gas and a refrigerant which in the gaseous state is of a relatively higher density than the inert auxiliary gas, said evaporator being situated at a higher level than the said absorber, and full open communication means between the interior spaces of said absorber and the said evaporator, said communication means being connected to the evaporator adjacent the bottom thereof, the absorber being located laterally of the lower part of the said communication means and being in open connection with same through two passages at different levels, the upper one of said passages being formed by a U-shaped conduit having one leg connected to the absorber and the other leg connected to the said communication means, the latter leg being mounted for cold exchange with the contents of the said communication means, the said legs being dimensioned and arranged so as to prevent substantial reverse flow of the inert auxiliary gas from the absorber to the evaporator through the said U-shaped conduit due to differences in density as between the gases in different parts of the space enclosed by said evaporator, absorber and communication means.

3. A continuous absorption machine comprising an absorber and an evaporator containing an inert auxiliary gas and a refrigerant which in the gaseous state is of a relatively higher density than the inert auxiliary gas, said evaporator being situated at a higher level than the said absorber, and full open communication means between the interior spaces of the said absorber and the said evaporator, said communication means being connected to the evaporator adjacent the bottom thereof, the absorber being located laterally of the lower part of the said communication means and being in open connection with the same through two passages at different levels, the upper one of said passages being formed by a U-shaped conduit having one leg connected to the absorber and the other leg connected to the said communication means, said U-shaped conduit being dimensioned and arranged so as to prevent substantial reverse flow therethrough of the inert auxiliary gas from the absorber to the evaporator due to differences in density as between the gases in different parts of the space enclosed by said evaporator, absorber and communication means and the lower one of said passages connecting the lower end of said communication means to a lower portion of the absorber.

4. A continuous absorption machine comprising an absorber and an evaporator containing an inert auxiliary gas and a refrigerant which in the gaseous state is of a relatively higher density than the inert auxiliary gas, said evaporator being situated at a higher level than the said absorber, and full open communication means between the interior spaces of the said absorber and the said evaporator, said communication means being connected to said evaporator adjacent the bottom thereof, the absorber being located laterally of the lower part of the said communication means and being in open connection with same through two passages at different levels, the upper one of said passages being formed by a U-shaped conduit having one leg connected to the absorber and the other leg connected to the said communication means, said U-shaped conduit being dimensioned and arranged so as to prevent substantial reverse flow therethrough of the inert auxiliary gas from the absorber to the evaporator due to differences in density as between the gases in different parts of the space enclosed by said absorber, evaporator and communication means, the lowermost point of the U-shaped conduit being situated at a higher level than the lower one of the said passages.

5. A continuous absorption machine comprising an absorber and an evaporator containing an inert auxiliary gas and a refrigerant which in the gaseous state is of a relatively higher density than the inert auxiliary gas, said evaporator being situated at a higher level than the said absorber, and full open communication means between the interior spaces of the said absorber and the said evaporator, said communication means being connected to said evaporator adjacent the bottom thereof, the absorber being located laterally of the lower part of the said communication means and being in open connection with the same through two passages at different levels, the upper one of said passages being formed by a U-shaped conduit having one leg connected to the absorber and the other leg connected to the said communication means, the latter leg being mounted for cold exchange with the contents of the said communication means, the said legs being dimensioned and arranged so as to prevent substantial reverse flow of the inert auxiliary gas from the absorber to the evaporator through the said U-shaped conduit due to differences in density as between the gases in different parts of the space enclosed by said absorber, evaporator and communication means, the level of the lowermost point of the interior of the U-shaped conduit being located not more than three inches above the level through the top of the lowermost portion of the lower one of the said passages.

6. A continuous absorption machine comprising an absorber and an evaporator containing an inert auxiliary gas and a refrigerant which in the gaseous state is of a relatively higher density than the inert auxiliary gas, said evaporator being situated at a higher level than the said absorber, and full open communication means between the interior spaces of the said absorber and the said evaporator, said communication means being connected to the evaporator adjacent the bottom thereof, the absorber being located laterally of the lower part of the said communication means and being in open connection with the same through two passages at different levels, the upper one of said passages being formed by a U-shaped conduit having one leg connected to the absorber and the other leg connected to the said communication means, said U-shaped conduit being dimensioned and arranged so as to prevent substantial reverse flow therethrough of the inert auxiliary gas from the absorber to the evaporator due to differences in density as between the gases in different parts of the space enclosed by said evaporator, absorber and communication means, the said communication means including an inclined and a vertical conduit.

7. A continuous absorption machine comprising an absorber and an evaporator containing an inert auxiliary gas and a refrigerant which in the gaseous state is of a relatively higher density than the inert auxiliary gas, said evaporator being situated at a higher lever than the said absorber, and full open communication means between the interior spaces of the said absorber and the said evaporator, said communication means being connected to the evaporator adjacent the bottom thereof, the absorber being located laterally of the lower part of the said communication means and being in open connection with the same through two passages at different levels, the upper one of said passages being formed by a U-shaped conduit having one leg connected to the absorber and the other leg connected to the said communication means, said U-shaped conduit being dimensioned and arranged so as to prevent substantial reverse flow therethrough of the inert auxiliary gas from the absorber to the evaporator due to differences in density as between the gases in different parts of the space enclosed by said evaporator, absorber and communication means, the said communication means consisting of ducts which incline downwardly toward the absorber at an angle of at least 6°.

8. A continuous absorption machine comprising an absorber and an evaporator containing an inert auxiliary gas and a refrigerant which in the gaseous state is of a relatively higher density than the inert auxiliary gas, said evaporator being situated at a higher level than the said absorber, and full open communication means between the interior spaces of the said absorber and the said evaporator, said communication means being connected to the evaporator adjacent the bottom thereof, the absorber being located laterally of the lower part of the said communication means and being in open connection with the same through two passages at different levels, the upper one of said passages being formed by a U-shaped conduit having one leg connected to the absorber and the other leg connected to the said communication means, the latter leg being mounted for cold exchange with the contents of the said communication means, the said legs being dimensioned and arranged so as to prevent substantial reverse flow of the inert auxiliary gas from the absorber to the evaporator through the said U-shaped conduit due to differences in density as between the gases in different parts of the space enclosed by said evaporator, absorber and communication means, the said communication means comprising an inclined duct at the evaporator side and a vertical duct at the absorber side.

9. A continuous absorption machine comprising an absorber and an evaporator containing an inert auxiliary gas and a refrigerant which in the gaseous state is of a relatively higher density than the inert auxiliary gas, said evaporator being situated at a higher level than the said absorber, and full open communication means between the interior spaces of the said absorber and the said evaporator, said communication means being connected to the evaporator adjacent the bottom thereof, the absorber being located laterally of the lower part of the said communication means and being in open connection with the same through two passages at different levels, the upper one of said passages being formed by a U-shaped conduit having one leg connected to the absorber and the other leg connected to the said communication means, the latter leg being mounted for cold exchange with the contents of the said communication means by being arranged within the latter, said U-shaped conduit being dimensioned and arranged so as to prevent substantial reverse flow therethrough of the inert auxiliary gas from the absorber to the evaporator due to differences in density as between the gases in different parts of the space enclosed by said evaporator, absorber and communication means, the said communication means comprising a vertical duct at the absorber side and an inclined duct at the evaporator side, the said inclined duct debouching into the vertical duct near the top of the latter, the leg of the U-shaped conduit being arranged within the vertical duct and extending upwardly above the point of debouchment of the inclined duct into the vertical duct.

10. A continuous absorption machine comprising an absorber and an evaporator containing an inert auxiliary gas and a refrigerant which in the gaseous state is of a relatively higher density than the inert auxiliary gas, said evaporator being situated at a higher level than the said absorber, and full open communication means between the interior spaces of the said absorber and the said evaporator, said communication means being connected to the evaporator adjacent the bottom thereof, the absorber being located laterally of the lower part of the said communication means and being in open connection with the same through two passages at different levels, the upper one of said passages being formed by a U-shaped conduit having one leg connected to the absorber and the other leg connected to the said communication means, the latter leg being mounted for cold exchange with the contents of the said communication means, the said legs being dimensioned and arranged so as to prevent substantial reverse flow of the inert auxiliary gas from the absorber to the evaporator through the said U-shaped conduit due to differences in density as between the gases in different parts of the space enclosed by said evaporator, absorber and communication means, the evaporator having one single internal space obstructed by partitions so as to provide for a predetermined path of the gases circulating therein, the said space merging at the bottom directly into the said communication means.

ALEXANDER BIKKERS.